United States Patent Office 2,724,719
Patented Nov. 22, 1955

2,724,719

PROCESS FOR THE PRODUCTION OF THIONO PHOSPHATES

Francis X. Markley, Royal Oak, and Melvin L. Larson, Ferndale, Mich., assignors to Ethyl Corporation, New York, N. Y., a corporation of Delaware No Drawing. Application November 16, 1953, Serial No. 392,505

4 Claims. (Cl. 260—461)

This invention pertains to a novel process for the production of organophosphorus-containing compounds and in particular is concerned with the preparation of organic thionophosphates.

It has long been known that various organic phosphates can be prepared by the reaction of phosphorus oxychloride with an epoxide, such as ethylene oxide, in the presence of a catalyst such as aluminum chloride. However, until the present invention the preparation of organic thionophosphates by reaction of epoxides upon thiophosphoryl chloride, which ordinarily would be presumed to react similar to phosphorus oxyhalide, has not been eminently successful. One reason for this is the fact that, contrary to expectation, reactions of thiophosphoryl halides are not analogous to reactions of phosphorus oxyhalides. For example, in processes wherein phosphorus oxychlorides are reacted with epoxides it is known that a catalyst such as phosphorus trichloride is ineffective. However, as will be pointed out in the discussion hereinafter, phosphorus trichloride has been found to catalyze the reaction of thiophosphoryl halides with epoxides. Further, it is a well known fact that esterification of phosphorus oxychloride with alcohols or phenols can be readily carried out in good yield without the use of catalysts, whereas the analogous reactions with thiophosphoryl chloride are slow, require higher temperatures, and in the absence of a catalyst often cannot be forced beyond the di-esterification stage.

It is an object, therefore, of this invention to provide a new and novel process for the production of organic thionophosphates. A specific object is to provide a process for the production of organic thionophosphates from the reaction of cyclic organic chalcogen-containing compounds and a thiophosphoryl halide, said reaction being catalyzed by a phosphorus trihalide. These and other objects will become apparent from the discussion hereinafter.

The process of this invention in its broadest form comprises the reaction between a cyclic organic chalcogen-containing compound and a thiophosphoryl halide in the presence of a phosphorus trihalide as a catalyst. The process of this invention comprises reacting organic chalcogen-containing compounds with thiophosphoryl halides with a phosphorus trihalide catalyst, so as to result in various organic thionophosphates. Solvents can also be employed in our process, preferably those solvents which are inert toward the reactants.

By the term cyclic organic chalcogen-containing compounds it is intended to include compounds having the following structure:

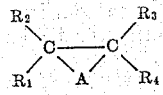

wherein $R_1$, $R_2$, $R_3$, and $R_4$ can be the same or different and are selected from the group consisting of organic radicals, nitrogen-containing radicals, sulfur-containing radicals, the halogens, the cyano radicals, hydrogen, and the like; and A is a chalcogen having an atomic weight of 16 to 32; namely, sulfur or oxygen.

As mentioned above, the groups $R_1$, $R_2$, $R_3$, and $R_4$ can be hydrogen, organic radicals, nitrogen-containing radicals, sulfur-containing radicals, the halogens, the cyano radicals, and the like. Thus, when these radicals are organic radicals, they can be aliphatic radicals, such as the alkyl radicals, methyl, ethyl, n-propyl, isopropyl, n-butyl, isobutyl, sec-butyl, tertiary butyl, n-amyl, and various positional isomers, such as, for example, 1-methylbutyl, 2-methylbutyl, 1,1-dimethylpropyl, 1,2-dimethylpropyl, 2,2-dimethylpropyl, and 1-ethylpropyl, and likewise the corresponding straight or branched chain isomers of hexyl, heptyl, octyl, nonyl, decyl, and the like up to and including about eicosyl. Moreover, such aliphatic radicals can be alkenyl radicals, such as, for example, ethenyl, $\Delta^1$-propenyl, $\Delta^2$-propenyl, isopropenyl, $\Delta^1$-butenyl, $\Delta^2$-butenyl, $\Delta^3$-butenyl, and the corresponding branched chain isomers thereof, and other alkenyl radicals, such as hexenyl, heptenyl, octenyl, nonenyl, decenyl, up to and including eicosenyl, and their corresponding branched chain isomers. Further, such organic substituents can be aralkyl radicals, such as, for example, benzyl, α-phenylethyl, β-phenylethyl, α-phenylpropyl, β-phenylpropyl, γ-phenylpropyl, α-phenylisopropyl, β-phenylisopropyl, α-phenylbutyl, β-phenylbutyl, γ-phenylbutyl, δ-phenylbutyl, and the like, and α'-naphthylmethyl, β'-naphthylmethyl, α-(α'-naphthyl)-ethyl, α-(β'-naphthyl)-ethyl, β-(α'-naphthyl)-ethyl, β-(β'-naphthyl)-ethyl, and the like, and their corresponding positional isomers. Moreover, the organic radical or radicals can be aralkenyl radicals, such as, for example, α-phenylethenyl, β-phenylethenyl, α-phenyl-$\Delta^1$-propenyl, β-phenyl-$\Delta^1$-propenyl, γ-phenyl-$\Delta^1$-propenyl, α-phenyl-$\Delta^2$-propenyl, β-phenyl-$\Delta^2$-propenyl, γ-phenyl-$\Delta^2$-propenyl, α-phenylisopropenyl, β-phenylisopropenyl, γ-phenylisopropenyl, and similarly, the phenyl derivatives of the isomers of butenyl, pentenyl, hexenyl, and the like. Other such aryl alkenyls include α-(α'-naphthyl)-ethenyl, α-(β'-naphthyl)-ethenyl, β-(α'-naphthyl)-ethenyl, β-(β'-naphthyl)-ethenyl, α-(α'-naphthyl)-$\Delta^1$-ethenyl, β-(β'-naphthyl)-$\Delta^1$-propenyl, β-(α'-naphthyl)-$\Delta^1$-propenyl, β-(β'-naphthyl)-$\Delta^1$-propenyl, α-(α'-naphthyl)-$\Delta^2$-propenyl, α-(β'-naphthyl)-$\Delta^2$-propenyl, β-(α'-naphthyl)-$\Delta^2$-propenyl, β-(β'-naphthyl)-$\Delta^2$-propenyl, α-(α'-naphthyl)-isopropenyl, α-(β'-naphthyl)-isopropenyl, β-(α'-naphthyl)-isopropenyl, β-(β'-naphthyl)-isopropenyl, and the like.

When the organic radical is an alicyclic radical or radicals, these can be selected from the group consisting of cycloalkyl and cycloalkenyl radicals. Thus, for example, they can be the cycloalkyl radicals, cyclopropyl, cyclobutyl, cyclopentyl, cyclohexyl, cycloheptyl, cyclooctyl, cyclononyl, cyclodecyl, and the like, and such cycloaliphatic radicals as α-cyclopropylethyl, β-cyclopropylethyl, α-cyclobutylpropyl, β-cyclobutylpropyl, γ-cyclobutylpropyl, and the like. Similarly, the alicyclic radicals can be cycloalkenyl radicals, such as, for example, α-cyclohexyl-ethenyl, β-cyclohexylethenyl, α-cycloheptyl-$\Delta^1$-propenyl, γ-cycloheptyl-$\Delta^1$-propenyl, α-cyclooctyl-$\Delta^2$-propenyl, β-cyclooctyl-$\Delta^2$-propenyl, γ-cyclooctyl-$\Delta^2$-propenyl, β-cyclononyl isopropenyl, and the like. When the organic radical is an aromatic radical or radicals, these can be selected from the group consisting of aryl and alkaryl radicals; for example, aryl radicals such as phenyl, α-naphthyl, β-naphthyl, α-anthryl, β-anthryl, and the like. Moreover, the aromatic radical can be alkaryl radicals, such as, for example, o-tolyl, m-tolyl, p-tolyl, 2,3-xylyl, 2,4-xylyl, 2,5-xylyl, 2,6-xylyl, 3,4-xylyl, 3,5-xylyl, and the like, or o-ethylphenyl, m-ethylphenyl, p-ethylphenyl, 2-methyl-α-naphthyl, 3-methyl-α-naphthyl, 4-methyl-α- naphthyl, 5-methyl-α-naphthyl, 6-methyl-α-naphthyl, 7-methyl-α-naphthyl, 8-methyl-α-naphthyl, and the like.

It is to be understood that the foregoing organic radicals can also be further substituted with other groups, preferably those which are inert to the principal reactants. That is, these radicals can have other substituents, such as, for example, the nitrogen-containing radicals, sulfur-containing radicals, the halogens, the cyano radicals, and the like. An example of a preferred reactant of this type is epichlorohydrin. Still other examples will be apparent to those skilled in the art.

As stated hereinbefore, the substituents $R_1$, $R_2$, $R_3$, and $R_4$ can be oxygen-containing radicals. Examples of these oxygen-containing radicals are

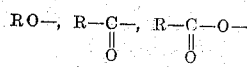

wherein R can be an organic radical as described previously.

Similarly, the radicals $R_1$ through $R_4$ can be sulfur-containing radicals. These radicals can be selected from the group consisting of

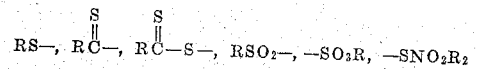

wherein R can be an organic radical as described hereinbefore. In addition, the groups $R_1$ to $R_4$ inclusive can be nitrogen-containing radicals, such as, for example, the radicals: $-NO_2$, $-NR_2$, $-NO$, $-NHNO_2$, and the like wherein R can be an organic radical. The groups $R_1$ to $R_4$ inclusive can also be the halogens; namely, chlorine, fluorine, bromine, and iodine; or they can be cyano and related groups, as, for example: $-CN$ and $-NC$.

It is not intended that the groups $R_1$ through $R_4$ shall be restricted to the examples cited herein, as additional examples will be evident to those experienced in the art.

In addition, the two carbon atoms shown in the above formula can be incorporated and form a part of a cyclic compound, such as, for example, cyclopentane, cyclohexane, cyclopentene, cyclohexene, and the like, which are then reacted to produce the epoxy or thioepoxy derivative of these compounds, and the unsatisfied valences of these two carbon atoms can be satisfied by the radicals mentioned previously for $R_1$, $R_2$, $R_3$, and $R_4$.

The thiophosphoryl halides employed according to the process of this invention can be thiophosphoryl chloride, thiophosphoryl bromide, thiophosphoryl iodide, and the like. Mixtures of these compounds can also be utilized which would then provide the organic thionophosphates having mixed halogen substitution. In a preferred embodiment of this invention single halides are employed.

The catalysts of the present invention comprise phosphorus trihalides. These include phosphorus tribromides, phosphorus trichlorides, phosphorus triiodides, mixed halides of trivalent phosphorus, such as phosphorus dichloridebromide, phosphorus chloride dibromide, phosphorus dichloride iodide, phosphorus chloride bromide iodide, and the like. Ordinarily, it is preferred to employ a catalyst whose halide function corresponds to the halogen of the thiophosphoryl halide which is employed.

The proportions of the cyclic organic chalcogen-containing compound and the thiophosphoryl halide are not critical to this invention. It is, however, preferred that at least the stoichiometric quantities are employed. Ordinarily, a slight excess of the cyclic organic chalcogen-containing compound is employed for more efficient operation. The proportion of the catalyst employed in the process of this invention is preferred to be at least 0.05 per cent by weight based upon the cyclic organic chalcogen-containing compound and preferably not more than about 5 per cent by weight. It has been found that quantities in excess of 5 per cent by weight do not appreciably increase the rate of reaction. Although quantities in excess of this amount are not detrimental, excessive amounts have not been found to be economical. Similarly, the quantity of the catalyst can be less than 0.05 per cent by weight. However, as this quantity is decreased, the speed of the reaction is decreased.

In general, the temperature employed in carrying out the process of this invention is any temperature at which reaction will commence. Ordinarily, temperatures should be maintained above about 50° C., preferably between about 50 and 100° C. In this instance temperatures above 100° C. can be employed; however, they are less desirable since by-products may be formed, and deleterious side effects will occur. Likewise, temperatures below 50° C. can be employed. However, such temperatures will increase the reaction time and are therefore less desirable. Ordinarily, the reaction is conducted at atmospheric pressure, thus avoiding the necessity of expensive pressurized equipment.

The sequence of mixing the reactants is not critical. For example, the cyclic organic chalcogen-containing compound can be mixed into the thiophosphoryl halide, and conversely, the thiophosphoryl halide can be added to the cyclic organic chalcogen-containing compound. Similarly, the catalyst can be added at any time; that is, it can be mixed with the cyclic organic chalcogen-containing compound and then added to the thiophosphoryl halide; it can be added to the thiophosphoryl halide and these two components then added to the cyclic organic chalcogen-containing compound; or it can be added separately.

The following examples, wherein all parts and percentages are by weight, will further demonstrate the process of this invention.

*Example I*

To a reactor equipped with a means for agitating, a reflux condenser, and a dropping funnel, 206 parts of propylene oxide were added to a mixture of 169.45 parts of thiophosphoryl chloride containing about 6 parts of phosphorus trichloride. The temperature of the reaction was maintained in the range of 60 to 80° C. After the addition of the propylene oxide was completed the reaction mass was continuously stirred for about 30 minutes at the same temperature. Then the excess propylene oxide was removed by fractional distillation. At the completion of the distillation operation, the product was cooled, and 364.5 parts of product were obtained, which amounted to 99+ per cent of the theoretical. The product possesses an index of refraction of $n_D^{21.5}$ 1.4875. The product was washed twice with 100 parts of 10 per cent aqueous solution of disodium tartrate followed by two washings with 100 parts of water. The product was then separated from the aqueous phase and dried over anhydrous sodium sulfate. Subsequent to such treatment the yield was 268.5 parts, amounting to 78 per cent theoretical. This so-treated product also had an index of refraction of $n_D^{21.5}$ 1.4875. The analysis of the product was 8.85 per cent of phosphorus and 30.7 per cent of chlorine, whereas $C_9H_{18}Cl_3O_3PS$ requires 9.02 per cent phosphorus and 30.9 per cent chlorine.

When the same and similar procedures within the scope of the present invention as described above are carried out using other chalcogen, such as propylene sulfide, ethylene oxide, epichlorohydrin, ethylene sulfide, 1,2-butylene oxide, 1,2-butylene sulfide, and the like, good results are obtained. Equally good results are obtained with the use of other thiophosphoryl halides, such as thiophosphoryl bromide and iodide. In these cases temperatures in the lower portion of our temperature range are very suitable. Good results are also obtained with the use of other catalysts of the present invention, such as phosphorus tribromide, phosphorus dichloride bromide, etc.

*Example II*

When an attempt is made to react propylene oxide with phosphorus oxychloride in the presence of phosphorus trichloride as a catalyst under conditions essentially the same as in Example I while using the same proportions of reactants even with a somewhat longer reaction time, the product is found to contain 11.32 per cent phosphorus and 40.3 per cent chlorine, whereas $C_9H_{16}Cl_3O_4P$ requires 9.5 per cent phosphorus and 32.4 per cent chlorine. Thus, this example demonstrates that phosphorus oxychloride does not react as thiophosphoryl chloride reacts upon cyclic organic chalcogen-containing compounds.

Although hydrolytic treatment has been described in the foregoing examples, such treatment is not intended to be a limitation of this invention. Ordinarily, the products obtained according to the process of this invention can be used as obtained without such treatment.

The foregoing examples have demonstrated the process of this invention when employing propylene oxide as a starting material. Similar results are obtained when employing other compounds as described previously as the starting material, and the process of this invention will provide compounds having the following general formula:

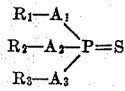

wherein each of $A_1$, $A_2$, and $A_3$ can be the same or different and is a chalcogen having an atomic weight of about 16 and 32, and each of the $R_1$, $R_2$, and $R_3$ groups can be the same or different and are halo-substituted radicals of the radicals hereinbefore defined. Thus, by particular choice of the cyclic organic chalcogen-containing compound and the thiophosphoryl halide to be reacted therewith, a considerable variety of products can be obtained when employing the process of this invention. By way of example, ethylene oxide can be reacted with thiophosphoryl chloride so as to produce tris-(2-chloroethyl)-thionophosphate. Similarly, ethyl sulfide can be reacted with thiophosphoryl bromide to produce tris-(2-bromoethyl)-trithiolo-thionophosphate. Likewise, ethylene oxide can be reacted with thiophosphoryl bromide according to the process of this invention to produce tris-(2-bromoethyl)-thionophosphate. In addition, propylene oxide, when reacted with thiophosphoryl chloride, will produce tris-(2-chloropropyl)-thionophosphate. Further, propylene oxide can be reacted with thiophosphoryl chloride to produce tris-(2-chloroisopropyl)-thionophosphate. Similarly, 1-chloropropylene oxide can be reacted with thiophosphoryl chloride to produce tris-(1,2 - dichloropropyl) - thionophosphate. Likewise, 3-chloro-hexylene oxide can be reacted with thiophosphoryl chloride to produce tris-(3,5-dichlorohexyl)-thionophosphate. The process of this invention will also produce di-(2-chloropropyl) (2-chloroisopropyl)-thionophosphate when reacting propylene oxide with thiophosphoryl chloride. In addition, tris-(1,1,2-tribromopropyl)-thionophosphate will be prepared when reacting 1,1-dibromopropylene oxide with thiophosphoryl bromide according to the process of this invention. Likewise, tris-(2-bromopropyl)-trithiolo-thionophosphate will be prepared when reacting propylene sulfide with thiophosphoryl bromide. In addition (2-chloro-3-phenylpropyl)-di-(2-chloroethyl)-thionophosphate can be prepared when reacting a mixture of about 2 parts of ethylene oxide and 1 part of 3-phenylpropylene oxide with thiophosphoryl chloride. Further, tris-(2-iodoethyl)-thionophosphate will be prepared when reacting ethylene oxide with thiophosphoryl iodide. Similarly, this-(2-chloro-2-phenylethyl)-thionophosphate can be prepared when reacting 2-phenylethylene oxide with thiophosphoryl chloride. In addition, tris-(2-chloro-$\Delta^4$-cyclohexenyl)-thionophosphate can be prepared when reacting $\Delta^4$-cyclohexene oxide with thiophosphoryl chloride. Still other compounds can be prepared according to the process of this invention as well as mixtures of various compounds, the foregoing serving merely as illustrative examples. It can be readily seen that the foregoing and many other compounds can be prepared by proper choice of the starting material and the thiophosphoryl halide.

One of the features of the present invention is that in cases where mixtures of products are possible, such as when asymmetric cyclic organic oxides and sulfides are used, the distribution of such products is different than when the mixtures are prepared by other methods, and these particular mixtures are especially suited for certain uses. A particular use for these mixtures is as additives for fuels and lubricating oils. The variance in the products depends upon which carbon-to-oxygen or carbon-to-sulfur bond is cleaved during the course of the reaction. When a mixture of cyclic organic oxides is used, there will be formed a plurality of β-haloaliphatic esters of thionophosphoric acid, the ratio of the constituents being determined by the original proportions of cyclic organic oxides, their respective reaction rates, and the manner in which the carbon-to-oxygen epoxide linkage is cleaved. Similarly, mixtures of cyclic sulfides produce mixtures of β-haloaliphatic thiolo-thionophosphates, with the proportions of the individual products again being contingent upon the ratio of the original cyclic sulfides and the manner in which the carbon-to-sulfur bonds of the thio-epoxide group are ruptured. When the present process is carried out utilizing a mixture of alkylene oxides and cyclic sulfides, a correspondingly more complex mixture of β-haloaliphatic thionophosphates and β-haloaliphatic thiolo-thionophosphates results. If desired, the foregoing type of reaction products can be separated into individual constituents by conventional methods, such as fractionation, solvent extraction, chromatography, and the like. Likewise, stepwise addition of the various starting materials can be employed to produce mixed compounds.

The catalysts of the present invention can be any of those mentioned previously in conjunction with the examples presented above. The hereinbefore mentioned reactions and other embodiments of our process will be more rapid when a catalyst is employed. Also, yields are higher and a purer product is obtained. Furthermore, recovery procedures are simplified, as washing is not necessary. In a preferred embodiment the halide function of the catalyst should be the same as the halide function of the thiophosphoryl halide, although dissimilar halide functions can be used to equal advantage.

When a solvent is employed in conducting the process of this invention, it is preferred that the solvent be inert to the particular reactants. Likewise, in a preferred embodiment the solvents which are normally liquid at room temperature and have a boiling point approaching that of the reaction temperature are employed. In general, anhydrous solvents are employed and are preferred. Typical solvents include aliphatic and aromatic hydrocarbons, such as mineral oils, white oils, and the like, and chlorinated derivatives thereof; nitrobenzenes; ethers; and the like. Still other solvents can be employed, the foregoing serving merely as illustrative examples. If it is desirable to employ a volatile solvent, pressure can be employed in order to achieve the reaction temperature.

In the foregoing discussion the compounds produced according to the process of this invention have been referred to as thionophosphates. This nomenclature has been used consistently for uniformity. However, the compounds are sometimes loosely referred to as the thiophosphates. Thus, where the term thiono has been used, the meaning intended is that the sulfur is bonded to the phosphorus by a coordinate covalent bond; and where the term thiolo has been used, the meaning intended is that the sulfur is bonded to the phosphorus by a single covalent bond.

Having thus described the novel process of this invention, it is not intended that it be limited except as noted in the appended claims.

What is claimed is:

1. A process for the manufacture of tris-(2-chloropropyl)-thionophosphate which comprises reacting propylene oxide with thiophosphoryl chloride in the presence of a catalytic quantity of phosphorus trichloride.

2. A process for the manufacture of organic thionophosphates which comprises reacting a cyclic organic chalcogen-containing compound having the formula

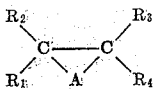

wherein $R_1$, $R_2$, $R_3$, and $R_4$ are selected from the group consisting of organic radicals, nitrogen-containing radicals, sulfur-containing radicals, halogens, cyano radicals, and hydrogen; and A is selected from the group consisting of oxygen and sulfur, with a thiophosphoryl halide in the presence of a phosphorus trihalide as catalyst.

3. A process for the manufacture of organic thionophosphates which comprises reacting a cyclic organic chalcogen-containing compound having the formula

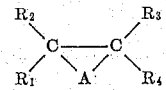

wherein $R_1$, $R_2$, $R_3$, and $R_4$ are selected from the group consisting of organic radicals, nitrogen-containing radicals, sulfur-containing radicals, halogens, cyano radicals, and hydrogen; and A is selected from the group consisting of oxygen and sulfur, with a thiophosphoryl halide in the presence of a phosphorus trihalide catalyst at a temperature of between about 50 and 100° C.

4. The process of claim 2 further defined in that the catalyst employed is a phosphorus trichloride.

References Cited in the file of this patent
UNITED STATES PATENTS

| | | |
|---|---|---|
| 2,536,647 | Kosolapoff | Jan. 2, 1951 |
| 2,610,978 | Lanham | Sept. 16, 1952 |